D. CLOW.
Fanning Mill.
No. Reissue 114
Reissued May 16, 1848
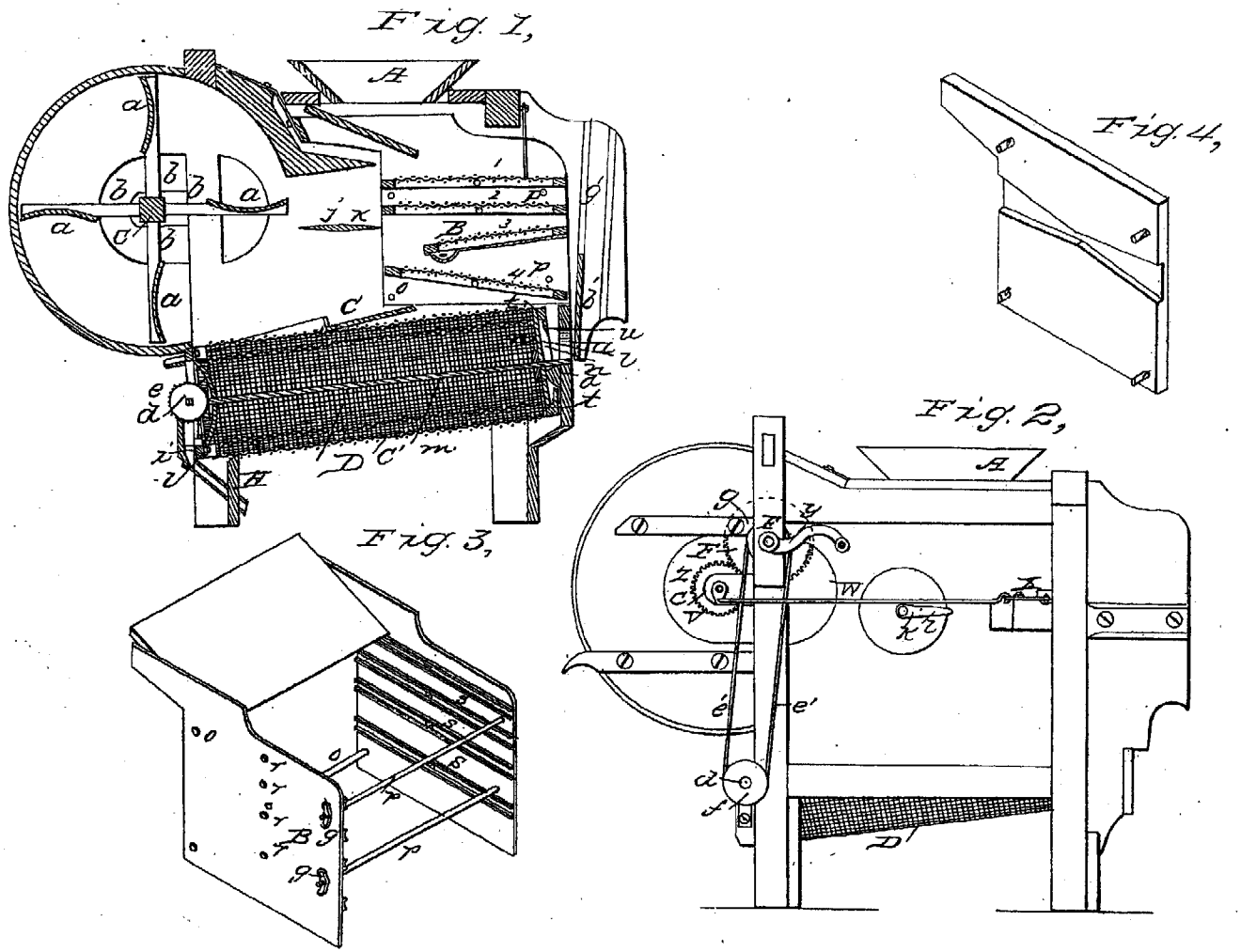
N. PETERS, Photo-Lithographer, Washington, D. C.

UNITED STATES PATENT OFFICE.

DANIEL CLOW, OF PORT BYRON, NEW YORK.

IMPROVEMENT IN WHEAT-FANS.

Specification forming part of Letters Patent No. 4,582, dated June 10, 1846; Reissue No. 114, dated May 16, 1848.

*To all whom it may concern:*

Be it known that I, DANIEL CLOW, of Port Byron, in the county of Cayuga and State of New York, have invented sundry Improvements in Fanning-Mills, by the aid of which grain of different kinds can be thoroughly cleaned and separated from every foreign substance, I denominating my invention "Clow's Combined Vibratory-Screen Fanning-Mill;" and I do hereby declare the following to be a full and exact description of the same, reference being had to the accompanying drawings, making a part of this specification.

Figure 1 is a vertical longitudinal section through the center of my improved fanning-mill. Fig. 2 is a side elevation of the same. Fig. 3 is a perspective elevation of the vibrating shoe containing the screens. Fig. 4 is a perspective elevation of one of the sides of a vibrating shoe detached, constructed in a different manner.

The same letters refer to corresponding parts in all the figures.

The supporting-frame of my improved fanning-mill is constructed in the usual manner. I give the face of the wings *a a* of the fan a concave form, for the purpose of adding to the strength of the blast without increasing the revolutions of the fan.

*b b* are the arms, and *c* is the shaft, of the fan. I introduce a regulator, J, between the fan and the vibrating shoe B, for the purpose of guiding and directing the current of wind from the fan onto whichever screen in the vibrating shoe that may be desired in cleaning different kinds of seeds or grains. The whole blast may be thrown onto the upper or onto the lower screens, or the greater portion onto one and the remainder onto the other. The regulator J is constructed of a plank having its edges beveled to a point.

*k* is the shaft or journal on which the regulator is vibrated.

*l* is a lever for moving and indicating the position of the regulator J.

My third improvement consists in the manner of constructing the shoe B, and securing the screens 1 2 3 4 in the same in such a manner that their position can be easily adjusted.

I generally construct the sides of the shoe of metallic plates, and connect them to each other by rods *o o* and *p p*. On one end of the rods *p p* I place screw-nuts *q q*. To the inner sides of the shoe I secure adjustable metallic groove-plates *s s* by rivets *r r* passing through their centers. The groove-plates *s s* receive the screens 1 2 3 4, which are firmly fastened in any desired position by the action of the screw-nuts *q q* on the ends of the rods *p p* forcing the sides of the shoe against them. By this arrangement the screens can be placed in a horizontal position, or at any angle of inclination that may be desired to suit the different kinds of seeds or grains to be cleaned.

When I construct the sides of the shoe of wood, I make the grooves for the reception of the screens of the form represented in Fig. 4 of the accompanying drawings—viz., at their centers they closely embrace the sides of the frames of the screens, and are enlarged each way from this point to their ends, by which form I am enabled to place the screens in any position desired, and firmly secure them by means of screw-bolts *p p*, as in the other modification of the shoe, with metallic sides.

*y* is a crank on the driving-shaft E.

F is a cog-wheel on the driving-shaft E, working into and communicating motion to the cog-wheel Z on the fan-shaft *c*.

V is a crank on the fan-shaft *c*, which communicates a vibratory movement to the shoe B through the medium of the connecting-rod W and elbow *x*, constructed in the usual manner.

*l* is a lever for operating the regulator J and indicating its position.

*b'* is a guide-board passing across the rear end of the mill, sliding in grooves *g'* in the sides of the mill.

The grain, after being acted upon while passing through and over the vibrating screens 1 2 3 4 in the shoe B, in the usual manner, is discharged from the screen 4 onto the apron G, which conducts it to the front of the mill.

Having thus fully described the construction and operation of my improvements to the fanning-mill, what I claim therein as new, and desire to secure by Letters Patent, is—

The adjustable groove-plates *s s*, for confining the screens to the sides of the shoe B, and in combination therewith the manner of securing the screens firmly in any desired position by the rods *p p* and screw-nuts *q q*, substantially in the manner and for the purpose herein set forth.

DANIEL CLOW.

Witnesses:

JACOB P. YATES,

HENRY R. FORD.